(12) United States Patent
Chen (10) Patent No.: US 12,284,196 B1
(45) Date of Patent: Apr. 22, 2025

(54) DATA PROCESSING METHOD, DEVICE, AND STORAGE MEDIUM

(71) Applicant: Beijing Volcano Engine Technology Co., Ltd., Beijing (CN)

(72) Inventor: Guo Chen, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/819,535

(22) Filed: Aug. 29, 2024

(30) Foreign Application Priority Data

Oct. 18, 2023 (CN) .......................... 202311355426.4

(51) Int. Cl.
*H04L 9/40* (2022.01)
(52) U.S. Cl.
CPC ........ *H04L 63/1416* (2013.01); *H04L 63/123* (2013.01)
(58) Field of Classification Search
None
See application file for complete search history.

(56) References Cited

U.S. PATENT DOCUMENTS

| | | | |
|---|---|---|---|
| 11,102,244 B1* | 8/2021 | Jakobsson | ............... H04L 51/42 |
| 11,757,914 B1* | 9/2023 | Jakobsson | ............... H04L 51/42 |
| | | | 726/25 |
| 2005/0216954 A1* | 9/2005 | Ramaiah | ............. H04L 63/1458 |
| | | | 726/22 |
| 2006/0053487 A1 | 3/2006 | Jeffries et al. | |
| 2013/0031605 A1 | 1/2013 | Huston, III et al. | |
| 2018/0097720 A1* | 4/2018 | Jaffer | ..................... H04L 45/22 |
| 2018/0324209 A1* | 11/2018 | Zhang | ................. H04L 63/1441 |
| 2021/0306373 A1* | 9/2021 | Guo | ..................... H04L 63/1433 |

FOREIGN PATENT DOCUMENTS

| | | | | |
|---|---|---|---|---|
| CN | 105122765 A | | 12/2015 | |
| CN | 108449280 A | | 8/2018 | |
| CN | 112187793 A | * | 1/2021 | ......... H04L 63/1458 |
| CN | 116232690 A | | 6/2023 | |

(Continued)

OTHER PUBLICATIONS

Office action received from Chinese patent application No. 202311355426.4 mailed on Sep. 6, 2024, 11 pages (5 pages English Translation and 6 pages Original Copy).

(Continued)

*Primary Examiner* — Joseph P Hirl
*Assistant Examiner* — Hassan Saadoun (57) ABSTRACT

A data processing method a device, and a storage medium are provided. The method includes: detecting, via a security detection device in response to receiving a data message sent by a client, whether a destination server corresponding to the data message is under cyberattack; in response to the destination server being under cyberattack, guiding the data message to a security protection device, and sending a test message to the client via the security protection device; and verifying, via the security protection device, the verification message returned by the client, and in response to the verification succeeding, determining that the client is a valid client and sending the data message to the destination server, or in response to the verification failing, determining that the client is an attacking client and discarding the data message.

20 Claims, 4 Drawing Sheets

(56) References Cited

FOREIGN PATENT DOCUMENTS

| CN | 117040867 A | * | 11/2023 |
| CN | 117596014 B | | 12/2024 |
| WO | 2021/160277 A1 | | 8/2021 |
| WO | 2023/116045 A1 | | 6/2023 |

OTHER PUBLICATIONS

Liu et al., "Jaqen: A High-Performance Switch-Native Approach for Detecting and Mitigating Volumetric DDoS Attacks with Programmable Switches", USENIX, Aug. 11-13, 2021, pp. 3829-3846.
Notification to Grant Patent Right for Invention received from Chinese patent application No. 202311355426.4 mailed on Nov. 20, 2024, 6 pages (2 pages English Translation and 4 pages Original Copy).
Office action received from Japanese patent application No. 2024-146202 mailed on Feb. 4, 2025, 10 pages (5 pages English Translation and 5 pages Original Copy).

* cited by examiner

DATA PROCESSING METHOD, DEVICE, AND STORAGE MEDIUM

CROSS-REFERENCE TO RELATED APPLICATION

This application claims the priority to and benefits of the Chinese Patent Application, No. 202311355426.4, which was filed on Oct. 18, 2023 and is hereby incorporated by reference in its entirety.

TECHNICAL FIELD

Embodiments of the present disclosure relate to the field of network security technologies, and in particular, to a data processing method, a device, and a storage medium.

BACKGROUND

ACKFlood is one of common distributed denial-of-service attacks (DDoSs) at present, and its main principle is to forge a large number of fake source IP addresses, and send a large number of ACK (acknowledge character) messages to a server by using the forged fake source IP addresses, so that the server is blocked by these malicious ACK messages, resulting in a denial of service of the server.

It is possible to verify whether a source IP address of a client is valid through a timeout retransmission mechanism of a transmission control protocol (TCP). The specific steps are as follows. When an ACKFlood attack occurs, a protection system discards an ACK message. If the client retransmits the ACK message within a specified time, it is determined that the source IP address of the client is valid; or if the client does not retransmit the ACK message within a specified time, it is determined that the source IP address of the client is invalid.

However, the inventors have found that at least the following technical problems are present. As session timeout retransmission is required after an ACK retransmission algorithm is enabled, a network lag of the client may occur for a short time, which results in poor user experience especially for delay-sensitive services (e.g., games).

SUMMARY

Embodiments of the present disclosure provide a data processing method and apparatus, a device, and a storage medium.

At least one embodiment of the present disclosure provides a data processing method applied to a network protection system that includes a security detection device and a security protection device. The method includes:

detecting, via the security detection device in response to receiving a data message sent by a client, whether a destination server corresponding to the data message is under cyberattack;

in response to detecting that the destination server is under cyberattack, guiding the data message to the security protection device, and sending a test message to the client via the security protection device, where a sequence number of the test message is out of a sliding window of the client, so that the client is triggered to return a verification message to the security protection device; and verifying, via the security protection device, the verification message returned by the client, and in response to the verification succeeding, determining that the client is a valid client and sending the data message to the destination server, or in response to the verification failing, determining that the client is an attacking client and discarding the data message.

At least one embodiment of the present disclosure provides a data processing apparatus applied to a network protection system that includes a security detection device and a security protection device. The apparatus includes:

a detection module configured to detect, via the security detection device in response to receiving a data message sent by a client, whether a destination server corresponding to the data message is under cyberattack;

a sending module configured to: in response to detecting that the destination server is under cyberattack, guide the data message to the security protection device, and send a test message to the client via the security protection device, where a sequence number of the test message is out of a sliding window of the client, so that the client is triggered to return a verification message to the security protection device; and a verification module configured to: verify, via the security protection device, the verification message returned by the client, and in response to the verification succeeding, determine that the client is a valid client and send the data message to the destination server, or in response to the verification failing, determine that the client is an attacking client and discard the data message.

At least one embodiment of the present disclosure provides an electronic device. The electronic device includes:

at least one processor and at least one memory communicatively connected to the at least one processor.

The at least one memory stores computer-executable instructions.

The at least one processor executes the computer-executable instructions stored in the memory, to implement the data processing method described above.

At least one embodiment of the present disclosure provides a non-transient computer-readable storage medium storing computer-executable instructions that, when executed by a processor, cause the data processing method described above to be implemented.

At least one embodiment of the present disclosure provides a computer program product including a computer program that, when executed by a processor, causes the data processing method described above to be implemented.

BRIEF DESCRIPTION OF DRAWINGS

In order to more clearly describe the technical solutions in the embodiments of the present disclosure, the accompanying drawings for describing the embodiments will be briefly described below. Apparently, the accompanying drawings in the description below show some embodiments of the present disclosure, and persons of ordinary skill in the art may still derive other accompanying drawings from these accompanying drawings without creative efforts.

DETAILED DESCRIPTION

In order to make the objects, technical solutions and advantages of embodiments of the present disclosure clearer, the technical solutions in the embodiments of the present disclosure will be described clearly and completely below with reference to the accompanying drawings in the embodiments of the present disclosure. Obviously, the embodiments described are some of, rather than all of, the embodiments of the present disclosure. All the other embodiments obtained by persons of ordinary skill in the art based on the embodiments of the present disclosure without any creative effort shall fall within the scope of protection of the present disclosure.

It should be noted that user information (including but not limited to device information, personal information, etc., of a user) and data (including but not limited to data for analysis, stored data, displayed data, etc.) involved in the present application are information and data for which an authorization is obtained from the user or a full authorization is obtained from each party, and the collection, use, and processing of relevant data need to comply with relevant laws, regulations, and standards, for which corresponding operation entries are provided for the user to choose to authorize or deny.

ACKFlood is one of common distributed denial-of-service attacks (DDoSs) at present, and its main principle is to forge a large number of fake source IP addresses, and send a large number of ACK (acknowledge character) messages to a server by using the forged fake source IP addresses, so that the server is blocked by these malicious ACK messages, resulting in a denial of service of the server.

It is possible to verify whether a source IP address of a client is valid through a timeout retransmission mechanism of a transmission control protocol (TCP). The specific steps are as follows. When an ACKFlood attack occurs, a protection system discards an ACK message. If the client retransmits the ACK message within a specified time, it is determined that the source IP address of the client is valid; or if the client does not retransmit the ACK message within a specified time, it is determined that the source IP address of the client is invalid.

However, as session timeout retransmission is required after an ACK retransmission algorithm is enabled, a network lag of the client may occur for a short time, which results in poor user experience especially for delay-sensitive services (e.g., games). In addition, different clients may have short or long timeout retransmission intervals, so that the ACK message may be deleted by mistake due to a long time for retransmitting the ACK message, which also compromises the user experience.

It can thus be seen that it is an urgent problem at present to improve the quality of a network connection while ensuring network security.

In order to solve the above problems, the embodiments provide the following technical concepts. When the client and the server transmit data through the TCP, the TCP may use a sliding window for transmission control. That is, a receive end of messages has a sliding window of a specific size. As the messages are received in sequence, the sliding window moves continuously. However, if the receive end receives a message whose sequence number is not within a range of the sliding window, the message is referred to as being out of window (i.e., OOW), where the window here refers to the sliding window. It is specified in a protocol stack of the TCP that when receiving an OOW message, the receive end (e.g., the client) discards the message, and returns an ACK message to a peer end (e.g., the server).

According to the present application, whether the source IP address of the client is valid may be verified by using an out of window mechanism, to implement protection against an ACKFlood attack. When receiving an OOW message, a valid client may trigger the out of window mechanism and return an ACK message, while an invalid client (or an attacking client) may neither trigger the out of window mechanism nor return an ACK message. Accordingly, the specific steps are: first, detecting, via a security detection device in response to receiving a data message sent by the client, whether a destination server corresponding to the data message is under cyberattack; then, in response to detecting that the destination server is under cyberattack, guiding the data message to a security protection device, and sending a test message to the client via the security protection device (i.e., the security protection device can send the test message to the client instead of the server), where a sequence number of the test message is out of a sliding window of the client, and the out of window mechanism may be triggered, so that the client returns a verification message to the security protection device; and finally, verifying, via the security protection device, the verification message returned by the client, and in response to the verification succeeding, determining that the client is a valid client and sending the data message to the destination server, or in response to the verification failing, determining that the client is an attacking client and discarding the data message.

In this case, when the destination server is under cyberattack, the test message may be sent to the client via the security protection device instead of the server. As the sequence number of the test message is out of the sliding window of the client, the client may be triggered to return the verification message. In this way, the verification message may be verified via the security protection device, to determine whether the client is valid. In addition, a network connection between the server and the client does not need to be disabled in the process of verifying the verification message via the security protection device, which improves the quality of the network connection during network security protection, and improves the user experience.

An application scenario of the embodiments of the present disclosure is explained below.

Figure 1:
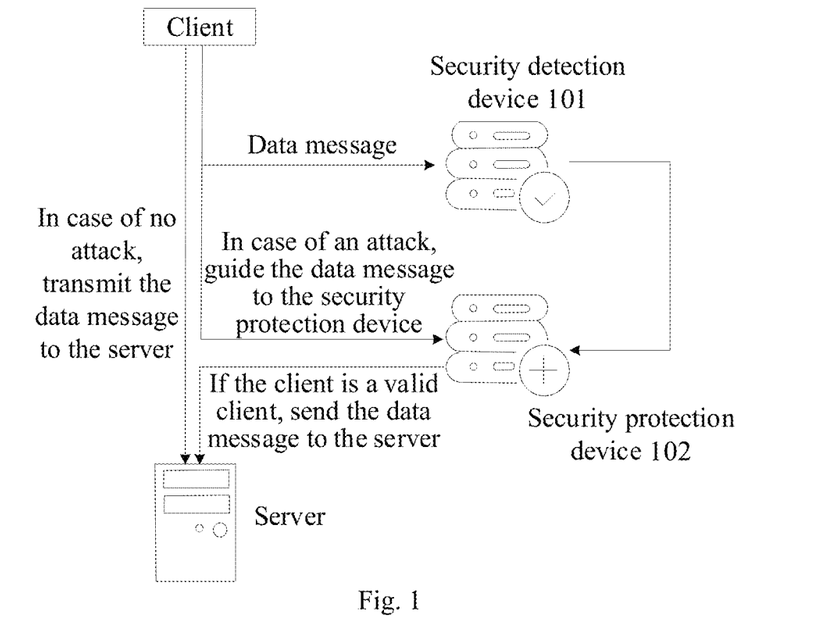
FIG. 1 is a schematic diagram of an application scenario of a data processing method according to an embodiment of the present disclosure.

A data processing method provided by the embodiments of the present disclosure may be applied to a scenario where a server is secured by a network protection system. FIG. 1 is a schematic diagram of the application scenario of the data processing method according to an embodiment of the present disclosure. As shown in FIG. 1, the network protection system includes a security detection device 101 and a security protection device 102. Whether a destination server is under cyberattack is detected via the security detection device 101. If the destination server is under cyberattack, a data message is guided to the security protection device 102, and whether a client is valid is verified via the security protection device 102. If it is determined that the client is a valid client, a data message is sent to the destination server; or if it is determined that the client is an attacking client, a data message is discarded. The data processing method provided by the embodiments of the present disclosure is described in detail below with reference to detailed embodiments.

Figure 2:
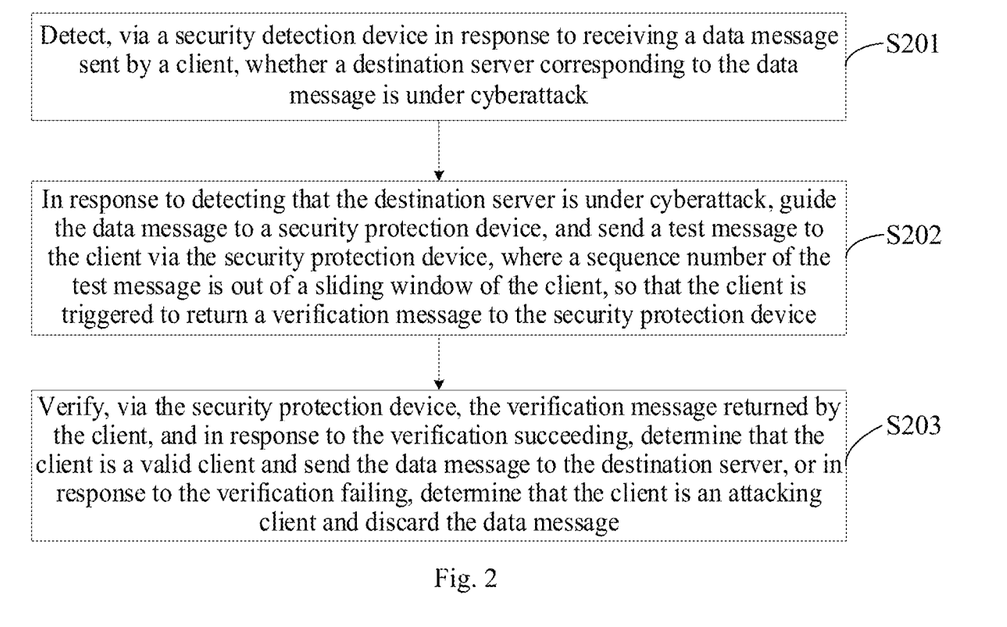
FIG. 2 is a flowchart of a data processing method according to an embodiment of the present disclosure.

FIG. 2 is a flowchart of the data processing method according to an embodiment of the present disclosure. The information processing may be applied to a network protection system that includes a security detection device and a security protection device. As shown in FIG. 2, the method includes the following steps.

S201: Detect, via the security detection device in response to a data message sent by a client, whether a destination server corresponding to the data message is under cyberattack.

In this embodiment of the present disclosure, the data message sent by the client may be a message in any format. For example, the data message may be an ACK message or a PUSHACK (PUSH acknowledge character) message. Optionally, in a network connection, the data message sent by the client refers to traffic sent by the client. Optionally, the destination server corresponding to the data message is a server to which the client intends to send the data message, i.e., a server to receive the data message.

In some embodiments, the security detection device may determine, based on information such as traffic, a number of packets, and a number of connections, whether the server is under cyberattack. Accordingly, the process of detecting, via the security detection device, whether the destination server corresponding to the data message is under cyberattack includes: detecting, via the security detection device, a number of messages, a number of data packets, and a number of connected clients for the destination server corresponding to the data message; and in response to the number of messages being greater than a first preset threshold, the number of data packets is greater than a second preset threshold, and/or the number of connected clients is greater than a third preset threshold, determining that the destination server is under cyberattack; or in response to the number of messages being not greater than a first preset threshold, the number of data packets is not greater than a second preset threshold, and the number of connected clients is not greater than a third preset threshold, determining that the destination server is not under cyberattack.

The cyberattack may be a DDOS cyberattack, including an ACKFlood attack. In this embodiment of the present disclosure, values of the first preset threshold, the second preset threshold, and the third preset threshold are not specifically limited, and may be set and modified as desired.

Figure 5:
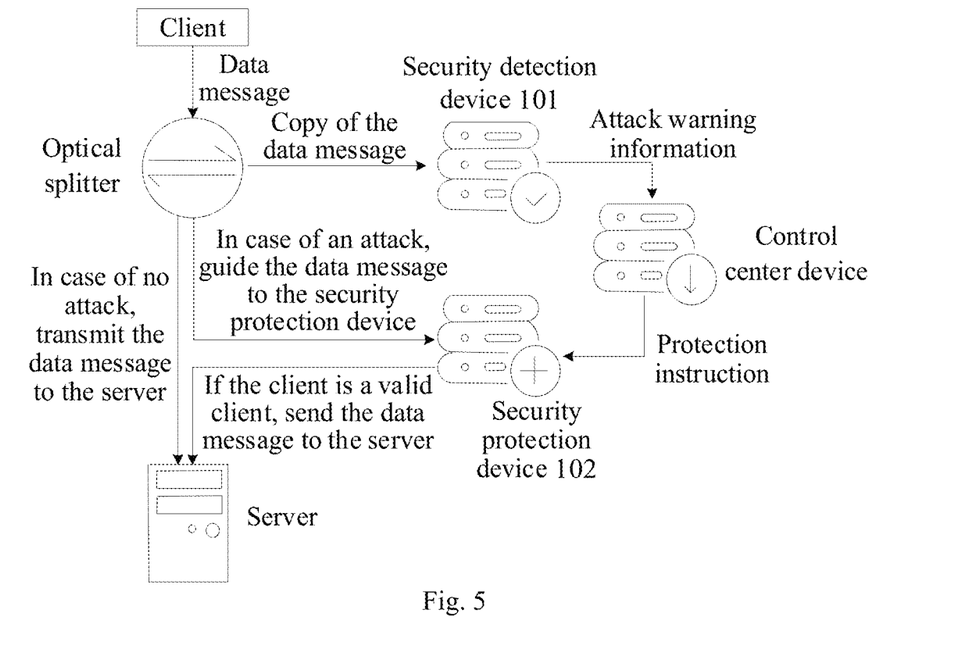
FIG. 5 is a schematic diagram of a structure of a security protection system according to an embodiment of the present disclosure.

It should be noted that, as shown in FIG. 5, the network protection system may further include an optical splitter. Accordingly, detecting, via the security detection device in response to receiving the data message sent by the client, whether the destination server corresponding to the data message is under cyberattack includes: in response to receiving the data message sent by the client, copying the data message via the optical splitter, sending a copy of the data message to the security detection device, and detecting, via the security detection device, whether the destination server corresponding to the data message is under cyberattack.

The data message is copied via the optical splitter, so that the security detection device implements real-time detection and analysis of the data message sent by the client, without affecting an original transmission link of the data message.

Further, the method may further include: in response to detecting that the destination server is not under cyberattack, sending, to the destination server, the data message sent by the client.

Here, since the optical splitter is provided for copying the data message, a security check can be performed on the copy of the data message while the data message is transmitted normally, that is, a security check can be performed on the destination server corresponding to the data message without affecting the normal transmission of the data message. Therefore, the transmission efficiency of the message data is improved.

S202: In response to detecting that the destination server is under cyberattack, guide the data message to the security protection device, and send a test message to the client via the security protection device, where a sequence number of the test message is out of a sliding window of the client, so that the client is triggered to return a verification message to the security protection device.

In this embodiment of the present disclosure, the sliding window may be a sliding window in a TCP connection. It should be noted that when the sequence number of the test message is out of the sliding window of the client, it is determined that the test message is an out of window (OOW) message. It is specified in a protocol stack of a TCP that when receiving an OOW message, the client discards the message, and returns a verification message. The test message may be a keepalive message, and the verification message may be a keepalive_ack message.

In order to ensure that the client can receive the test message sent by the security protection device, some message information of the test message needs to be defined first before the security protection device sends the test message to the client. Optionally, a step of constructing the test message via the security protection device includes: determining an acknowledgement number of the data message sent by the client, and determining the sequence number of the test message to be the acknowledgement number of the data message minus a preset value; determining first session information of the data message sent by the client, the first session information including a source port, a destination port, a source address, a destination address, and a protocol type, and synchronizing second session information of the test message to be the first session information; setting a setting mode of the test message to ACK setting only; and/or setting the test message to carry no payload data.

Determining the sequence number of the test message to be the acknowledgement number of the data message minus the preset value can ensure that the sequence number of the test message is out of the sliding window of the client, so that the client is triggered to return the verification message to the security protection device. In this embodiment of the present disclosure, a value of the preset value is not specifically limited, and may be set and modified as desired. For example, the preset value is 1, the sequence number may be represented by seq, and the acknowledgement number may be represented by ack, where seq=ack−1. For example, the sliding window ranges from 33 to 40, and the acknowledgement number of the data message is 32. In this case, the sequence number of the test message is 31, out of the range of the sliding window, so that the client may be triggered to return the verification message to the security protection device.

The first session information includes the source port, the destination port, the source address, the destination address, and the protocol type. Synchronizing the second session information of the test message to be the first session information can ensure that the test message and the received data message are located in a same TCP session.

Setting the setting mode of the test message to ACK setting only can ensure that the client receives the test message.

Setting the test message to carry no payload data can avoid interference of the test message to original data of the client.

Figure 3:
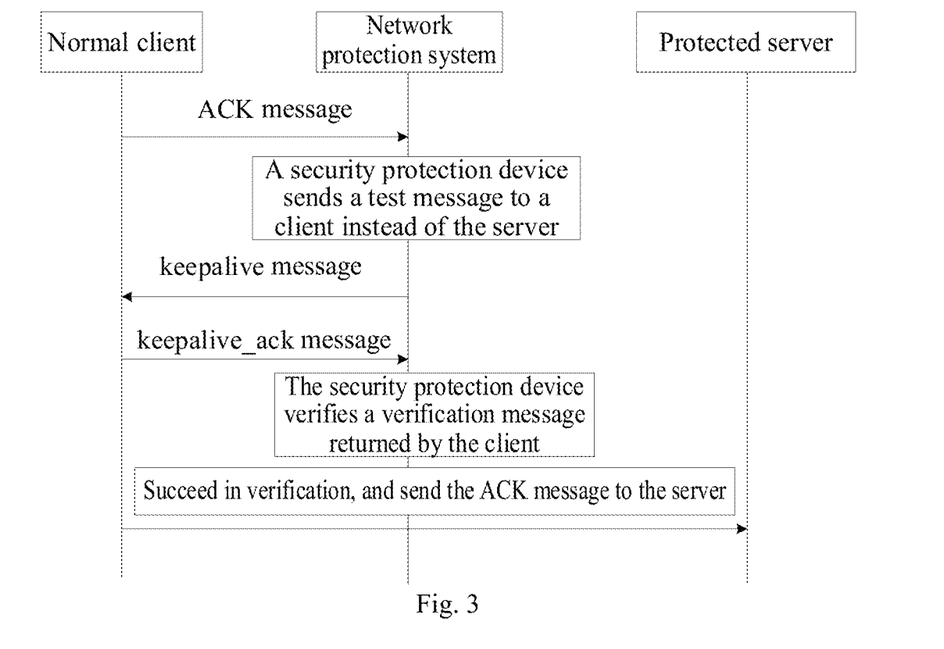
FIG. 3 is a schematic diagram of verifying a normal client according to an embodiment of the present disclosure.
Figure 4:
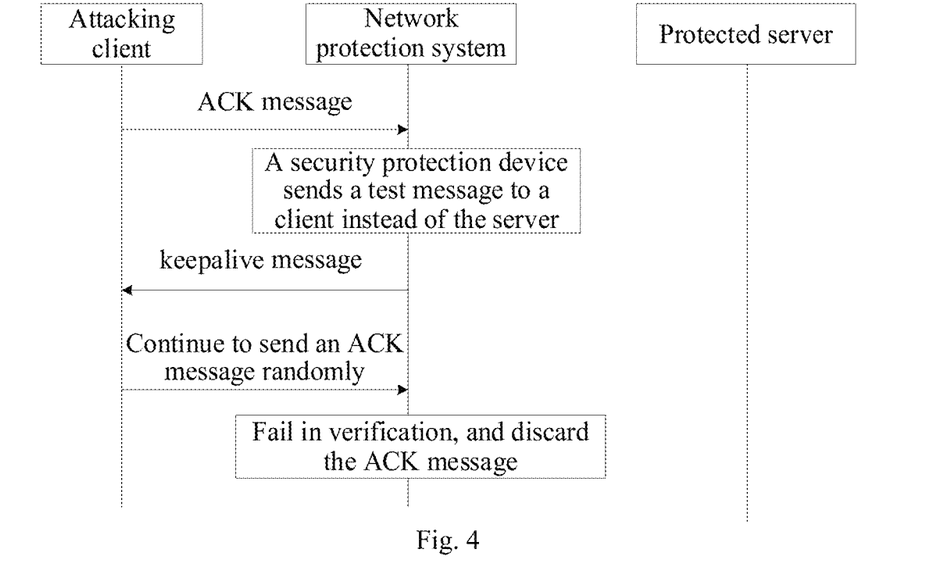
FIG. 4 is a schematic diagram of verifying an attacking client according to an embodiment of the present disclosure.

It should be noted that, as shown in FIG. 3, a normal client returns a verification message to the security protection device after receiving the test message (e.g., the keepalive message). As shown in FIG. 4, since an attacking client is not a real client, and does not have a TCP out-of-window mechanism, after receiving the test message, the attacking client does not return a verification message, but continues to send an ACK message or a PUSHACK message randomly. In some embodiments, if no verification message returned by the client is received within preset duration, it is determined, via the security protection device, that the client is an attacking client, and the data message is discards. In the embodiments of the present disclosure, a value of the preset duration is not specifically limited, and may be set and modified as desired. For example, the preset duration may be 1 second, 2 seconds, or 3 seconds.

In some embodiments, as shown in FIG. 5, the network protection system further includes a control center device. The control center device may send a protection instruction to the security protection device to control the security protection device to start a protection mechanism.

Optionally, the step of guiding the data message to the security protection device includes: sending attack warning information to the control center device via the security detection device, where the control center device is configured to send the protection instruction to the security protection device in response to receiving the attack warning information, and the protection instruction carries IP address information of the destination server corresponding to the data message; and determining, via the security protection device, a routing device corresponding to the IP address information of the destination server in response to receiving the protection instruction, and guiding the data message to the security protection device via the routing device. Here, after the data message is guided to the security protection device, the security protection device may intercept an attacking message in the data message, and a normal message may be sent to the corresponding destination server.

S203: Verify, via the security protection device, the verification message returned by the client, and in response to the verification succeeding, determine that the client is a valid client and send the data message to the destination server, or in response to the verification failing, determine that the client is an attacking client and discard the data message.

In this embodiment of the present disclosure, the verification message may be verified based on message information of the verification message. Accordingly, the step of verifying, via the security protection device, the verification message returned by the client includes: obtaining the message information of the verification message; determining, via the security protection device based on the message information, whether the verification message is a keepalive message; and in response to the verification message being the keepalive message, determining that the verification succeeds, or in response to the verification message being not the keepalive message, determining that the verification fails.

The keepalive message may be a Keepalive_ack message. A normal client returns a Keepalive_ack message to the security protection device after receiving the test message. However, since the attacking client is not a real client, it does not return a verification message, but continues to send an ACK message or a PUSHACK message randomly. In this case, the message returned by the attacking client is not the keepalive message (the Keepalive_ack message).

Optionally, the message information of the verification message includes one or more of the following: session information, time-to-live information, a setting mode, whether payload data is carried, an acknowledgement number, and a sequence number. Accordingly, the determining, via the security protection device based on the message information, whether the verification message is a keepalive message may include: determining, via the security protection device based on at least one piece of message information of the verification message, whether the verification message is the keepalive message.

It should be noted that, when it is determined, based on a plurality pieces of message information, whether the verification message is the keepalive message, if it is determined, based on any one piece of the message information, that the verification message is not the keepalive message, it is determined that the verification message is not the keepalive message; or if it is determined, based on each of the plurality of pieces of message information, that the verification message is the keepalive message, it is determined that the verification message is the keepalive message.

For example, it is determined, based on the session information and the time-to-live information, whether the verification message is the keepalive message. When it is determined, based on the session information, that the verification message is the keepalive message, and it is determined, based on the time-to-live information, that the verification message is the keepalive message, it is determined that the verification message is the keepalive message. When it is determined, based on the session information, that the verification message is not the keepalive message, or it is determined, based on the time-to-live information, that the verification message is not the keepalive message, it is determined that the verification message is not the keepalive message.

Specific steps for determining, based on the session information and the time-to-live information, whether the verification message is the keepalive message are described in detail below.

Optionally, specific steps for determining, based on the session information, whether the verification message is the keepalive message are: determining, via the security protection device, third session information of the verification message; and if the third session information is the same as the second session information of the test message, determining that the verification message is the keepalive message; or if the third session information is different from the second session information of the test message, determining that the verification message is not the keepalive message.

The second session information includes a source port, a destination port, a source address, a destination address, and a protocol type. If the third session information is the same as the second session information, it can be ensured that the verification message and the test message are located in the same TCP session.

Optionally, specific steps for determining, based on the time-to-live information, whether the verification message is the keepalive message are: determining, via the security protection device, first time-to-live information of the data message sent by the client and second time-to-live information of the verification message; and if the first time-to-live information is the same as the second time-to-live information, determining that the verification message is the keepalive message; or if the first time-to-live information is different from the second time-to-live information, determining that the verification fails.

The first time-to-live information of the data message may be represented by ttl. A message randomly sent by the attacking client is random and may have same session information as the test message. Therefore, the first time-to-live information and the second time-to-live information may be set, to further improve security protection. It should be noted that as the attacking client sends messages randomly, the messages sent by the attacking client have different ttl.

Optionally, specific steps for determining, based on the setting mode, whether the verification message is the keepalive message are: determining, via the security protection device, the setting mode of the verification message; and if the setting mode of the verification message is ACK setting only, determining that the verification succeeds; or if the setting mode of the verification message is not ACK setting only, determining that the verification fails.

Setting the setting mode of the verification message to ACK setting only can ensure that the security protection device receives the verification message.

Optionally, specific steps for determining, based on whether the payload data is carried, whether the verification message is the keepalive message are: determining, via the security protection device, whether the payload data is carried in the verification message; and if the payload data is not carried in the verification message, determining that the verification succeeds; or if the payload data is carried in the verification message, determining that the verification fails.

Setting the verification message to carry no payload data can avoid interference of the verification message to the original data of the client.

Optionally, specific steps for determining, based on the acknowledgement number, whether the verification message is the keepalive message are: determining, via the security protection device, the acknowledgement number of the verification message; and if the acknowledgement number of the verification message is equal to the sequence number of the test message plus 1, determining that the verification succeeds; or if the acknowledgement number of the verification message is not equal to the sequence number of the test message plus 1, determining that the verification fails.

In response to the acknowledgement number of the verification message being equal to the sequence number of the test message plus 1, it can be ensured that the client has normally received a previous test message.

Optionally, specific steps for determining, based on the sequence number, whether the verification message is the keepalive message are: determining, via the security protection device, a sequence number of the data message sent by the client, a length value of the payload data, and the sequence number of the verification message; and if the sequence number of the verification message is equal to a sum of the sequence number of the data message sent by the client and the length value of the payload data, determining that the verification succeeds; or if the sequence number of the verification message is not equal to the sum of the sequence number of the data message sent by the client and the length value of the payload data, determining that the verification fails.

In response to the sequence number of the verification message being equal to the sum of the sequence number of the data message sent by the client and the length value of the payload data, it can be ensured that the data message sent by the client is a payload rather than an attacking message.

It should be added that one client needs to be verified only once. Accordingly, the method further includes: in response to the verification succeeding, associating first IP address information of the client with first time-to-live information of the data message, and adding the first IP address information to a whitelist; determining, in response to receiving a new data message, second IP address information of a client corresponding to the new data message and third time-to-live information of the new data message; and sending the new data message to a corresponding destination server directly in response to there being first IP address information in the whitelist that is the same as the second IP address information and first time-to-live information associated with the first IP address information is the same as the third time-to-live information.

The data processing method provided in this embodiment of the present disclosure includes: detecting, via the security detection device in response to receiving the data message sent by the client, whether the destination server corresponding to the data message is under cyberattack; in response to detecting that the destination server is under cyberattack, guiding the data message to the security protection device, and sending the test message to the client via the security protection device, where the sequence number of the test message is out of the sliding window of the client, so that the client is triggered to return the verification message to the security protection device; and verifying, via the security protection device, the verification message returned by the client, and in response to the verification succeeding, determining that the client is a valid client and sending the data message to the destination server, or in response to the verification failing, determining that the client is an attacking client and discarding the data message. In this embodiment of the present application, when the destination server is under cyberattack, the test message may be sent to the client via the security protection device instead of the server. As the sequence number of the test message is out of the sliding window of the client, the client may be triggered to return the verification message. In this way, the verification message may be verified via the security protection device, to determine whether the client is valid. In addition, a network connection between the server and the client does not need to be disabled in the process of verifying the verification message via the security protection device, which improves the quality of the network connection during network security protection, and improves the user experience.

Figure 6:
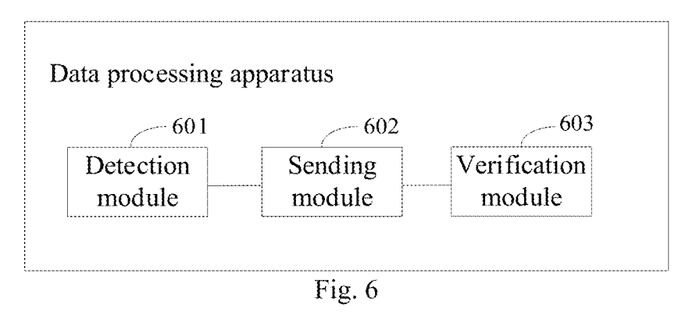
FIG. 6 is a block diagram of a structure of a data processing apparatus according to an embodiment of the present disclosure.

FIG. 6 is a block diagram of a structure of a data processing apparatus according to an embodiment of the present disclosure. The data processing apparatus is applied to a network protection system that includes a security detection device and a security protection device. Referring to FIG. 6, the apparatus includes a detection module 601, a sending module 602, and a verification module 603.

The detection module 601 is configured to detect, via the security detection device in response to receiving a data message sent by a client, whether a destination server corresponding to the data message is under cyberattack.

The sending module 602 is configured to: in response to detecting that the destination server is under cyberattack, guide the data message to the security protection device, and send a test message to the client via the security protection device, where a sequence number of the test message is out of a sliding window of the client, so that the client is triggered to return a verification message to the security protection device.

The verification module 603 is configured to: verify, via the security protection device, the verification message returned by the client, and in response to the verification succeeding, determine that the client is a valid client and send the data message to the destination server, or in response to the verification failing, determine that the client is an attacking client and discard the data message.

According to one or more embodiments of the present disclosure, the apparatus further includes a message generating module configured to: determine an acknowledgement number of the data message sent by the client, and determine the sequence number of the test message to be the acknowledgement number of the data message minus a preset value; determine first session information of the data message sent by the client, the first session information including a source port, a destination port, a source address, a destination address, and a protocol type, and synchronize second session information of the test message to be the first session information; set a setting mode of the test message to ACK setting only; and/or set that no payload data is carried in the test message.

According to one or more embodiments of the present disclosure, that the verification module 603 verifies, via the security protection device, the verification message returned by the client specifically includes: obtaining message information of the verification message; and determining, via the security protection device based on the message information of the verification message, whether the verification message is a keepalive message, and in response to the verification message being the keepalive message, determining that the verification succeeds, or in response to the verification message being not the keepalive message, determining that the verification fails.

According to one or more embodiments of the present disclosure, the message information of the verification message includes one or more of the following: session information, time-to-live information, a setting mode, whether payload data is carried, an acknowledgement number, and a sequence number. Accordingly, that the verification module 603 determines, via the security protection device based on the message information of the verification message, whether the verification message is a keepalive message specifically includes: determining, via the security protection device based on at least one piece of message information of the verification message, whether the verification message is the keepalive message.

According to one or more embodiments of the present disclosure, the network protection system further includes a control center device. That the sending module 602 guides the data message to the security protection device specifically includes: sending attack warning information to the control center device via the security detection device, where the control center device is configured to send a protection instruction to the security protection device in response to receiving the attack warning information, and the protection instruction carries IP address information of the destination server corresponding to the data message; and determining, via the security protection device, a routing device corresponding to the IP address information of the destination server in response to receiving the protection instruction, and guiding the data message to the security protection device via the routing device.

According to one or more embodiments of the present disclosure, a process in which the detection module 601 detects, via the security detection device, whether the destination server corresponding to the data message is under cyberattack specifically includes: detecting, via the security detection device, a number of messages, a number of data packets, and a number of connected clients for the destination server corresponding to the data message; and in response to the number of messages being greater than a first preset threshold, the number of data packets is greater than a second preset threshold, and/or the number of connected clients is greater than a third preset threshold, determining that the destination server is under cyberattack; or in response to the number of messages being not greater than a first preset threshold, the number of data packets is not greater than a second preset threshold, and the number of connected clients is not greater than a third preset threshold, determining that the destination server is not under cyberattack.

According to one or more embodiments of the present disclosure, the apparatus further includes an addition module configured to: in response to the verification succeeding, associate first IP address information of the client with first time-to-live information of the data message, and add the first IP address information to a whitelist; determine, in response to receiving a new data message, second IP address information of a client corresponding to the new data message and third time-to-live information of the new data message; and send the new data message to a corresponding destination server directly in response to there being first IP address information in the whitelist that is the same as the second IP address information and first time-to-live information associated with the first IP address information is the same as the third time-to-live information.

According to one or more embodiments of the present disclosure, the apparatus further includes a discarding module configured to: in response to no verification message returned by the client being received within preset duration, determine, via the security protection device, that the client is an attacking client, and discard the data message.

According to one or more embodiments of the present disclosure, the network protection system further includes an optical splitter. That the detection module 601 detects, via the security detection device in response to receiving the data message sent by the client, whether the destination server corresponding to the data message sent is under cyberattack specifically includes: in response to receiving the data message sent by the client, copying the data message via the optical splitter, sending a copy of the data message to the security detection device, and detecting, via the security detection device, whether the destination server corresponding to the data message is under cyberattack. The detection module 601 is further configured to: in response to detecting that the destination server is not under cyberattack, send the data message to the destination server.

The detection module 601, the sending module 602, and the verification module 603 are connected in sequence. The data processing apparatus provided in this embodiment may perform the technical solution of the above method embodiment. The implementation principles and technical effects thereof are similar, which are not repeated in this embodiment.

Figure 7:
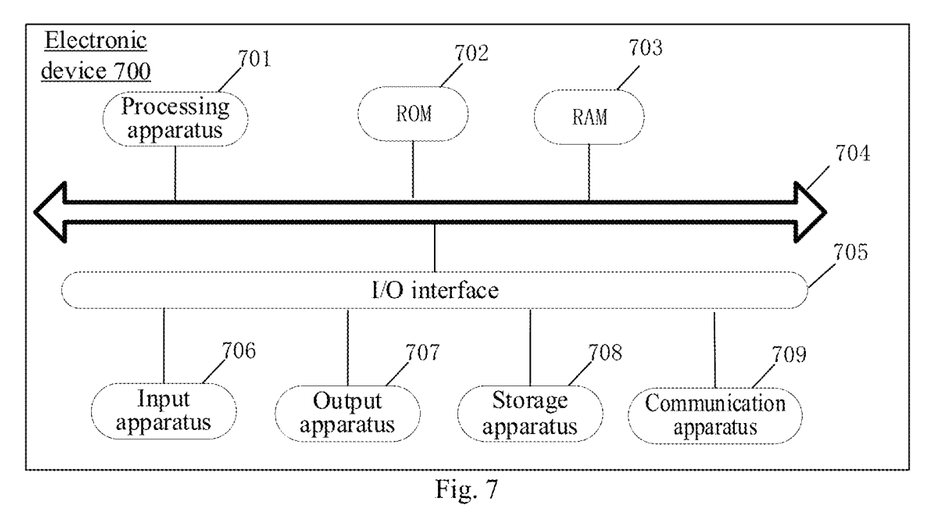
FIG. 7 is a schematic diagram of a hardware structure of an electronic device according to an embodiment of the present disclosure.

FIG. 7 is a schematic diagram of a hardware structure of an electronic device according to an embodiment of the present disclosure. Referring to FIG. 7, the electronic device 700 may be a terminal device or a server. The terminal device may include, but is not limited to, a mobile terminal such as a mobile phone, a notebook computer, a digital broadcast receiver, a personal digital assistant (PDA), a tablet computer (portable Android device, PAD), a portable media player (PMP), and a vehicle-mounted terminal (such as a vehicle navigation terminal), and a fixed terminal such as a digital TV and a desktop computer. The electronic device shown in FIG. 7 is merely an example, and shall not impose any limitation on the function and scope of use of the embodiments of the present disclosure.

As shown in FIG. 7, the electronic device 700 may include a processing apparatus (e.g., a central processing unit or a graphics processing unit) 701 that may perform a variety of appropriate actions and processing in accordance with a program stored in a read-only memory (ROM) 702 or a program loaded from a storage apparatus 708 into a random access memory (RAM) 703. The RAM 703 further stores various programs and data required for the operation of the electronic device 700. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 including, for example, a touchscreen, a touchpad, a keyboard, a mouse, a camera, a microphone, an accelerometer, and a gyroscope; an output apparatus 707 including, for example, a liquid crystal display (LCD), a speaker, and a vibrator; the storage apparatus 708 including, for example, a tape, and a hard disk; and a communication apparatus 709. The communication apparatus 709 may allow the electronic device 700 to perform wireless or wired communication with other devices to exchange data. Although FIG. 7 shows the electronic device 700 having various apparatuses, it should be understood that it is not required to implement or have all of the shown apparatuses. It may be an alternative to implement or have more or fewer apparatuses.

In particular, according to an embodiment of the present disclosure, the process described above with reference to the flowchart may be implemented as a computer software program. For example, this embodiment of the present disclosure includes a computer program product, which includes a computer program carried on a computer-readable medium, where the computer program includes program code for performing the method shown in the flowchart. In such an embodiment, the computer program may be downloaded and installed from a network through the communication apparatus 709, installed from the storage apparatus 708, or installed from the ROM 702. When the computer program is executed by the processing apparatus 701, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) or a flash memory, an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to perform the method shown in the above embodiment.

The computer program code for performing the operations in the present disclosure may be written in one or more programming languages or a combination thereof, where the programming languages include an object-oriented programming language, such as Java, Smalltalk, or C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user via any kind of network, including a local area network (LAN) or a wide area network (WAN), or may be connected to an external computer (for example, connected via the Internet with the aid of an Internet service provider).

The flowchart and block diagram in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by software, or may be implemented by hardware. Names of the units do not constitute a limitation on the units themselves in some cases, for example, a first obtaining unit may alternatively be described as "a unit for obtaining at least two Internet protocol addresses".

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) or a flash memory, an optic fiber, a portable compact disk read-only memory (CD-ROM), an optical storage device, a magnetic storage device, or any suitable combination thereof.

In a first aspect, according to one or more embodiments of the present disclosure, there is provided a data processing method applied to a network protection system that includes a security detection device and a security protection device. The method includes:
    detecting, via the security detection device in response to receiving a data message sent by a client, whether a destination server corresponding to the data message is under cyberattack;
    in response to detecting that the destination server is under cyberattack, guiding the data message to the security protection device, and sending a test message to the client via the security protection device, where a sequence number of the test message is out of a sliding window of the client, so that the client is triggered to return a verification message to the security protection device; and
    verifying, via the security protection device, the verification message returned by the client, and in response to the verification succeeding, determining that the client is a valid client and sending the data message to the destination server, or in response to the verification failing, determining that the client is an attacking client and discarding the data message.

According to one or more embodiments of the present disclosure, before the sending a test message to the client via the security protection device, the method further includes: determining an acknowledgement number of the data message sent by the client, and determining the sequence number of the test message to be the acknowledgement number of the data message minus a preset value; determining first session information of the data message sent by the client, the first session information including a source port, a destination port, a source address, a destination address, and a protocol type, and synchronizing second session information of the test message to be the first session information; setting a setting mode of the test message to ACK setting only; and/or setting the test message to carry no payload data.

According to one or more embodiments of the present disclosure, the verifying, via the security protection device, the verification message returned by the client includes: obtaining message information of the verification message; and determining, via the security protection device based on the message information of the verification message, whether the verification message is a keepalive message, and in response to the verification message being the keepalive message, determining that the verification succeeds, or in response to the verification message being not the keepalive message, determining that the verification fails.

According to one or more embodiments of the present disclosure, the message information of the verification message includes one or more of the following: session information, time-to-live information, a setting mode, whether payload data is carried, an acknowledgement number, and a sequence number. Accordingly, the determining, via the security protection device based on the message information of the verification message, whether the verification message is a keepalive message includes: determining, via the security protection device based on at least one piece of message information of the verification message, whether the verification message is the keepalive message.

According to one or more embodiments of the present disclosure, the network protection system further includes a control center device. The guiding the data message to the security protection device includes: sending attack warning information to the control center device via the security detection device, where the control center device is configured to send a protection instruction to the security protection device in response to receiving the attack warning information, and the protection instruction carries IP address information of the destination server corresponding to the data message; and determining, via the security protection device, a routing device corresponding to the IP address information of the destination server in response to receiving the protection instruction, and guiding the data message to the security protection device via the routing device.

According to one or more embodiments of the present disclosure, the process of detecting, via the security detection device, whether the destination server corresponding to the data message is under cyberattack includes: detecting, via the security detection device, a number of messages, a number of data packets, and a number of connected clients for the destination server corresponding to the data message; and in response to the number of messages being greater than a first preset threshold, the number of data packets is greater than a second preset threshold, and/or the number of connected clients is greater than a third preset threshold, determining that the destination server is under cyberattack; or in response to the number of messages being not greater than a first preset threshold, the number of data packets is not greater than a second preset threshold, and the number of connected clients is not greater than a third preset threshold, determining that the destination server is not under cyberattack.

According to one or more embodiments of the present disclosure, the method further includes: in response to the verification succeeding, associating first IP address information of the client with first time-to-live information of the data message, and adding the first IP address information to a whitelist; determining, in response to receiving a new data message, second IP address information of a client corresponding to the new data message and third time-to-live information of the new data message; and sending the new data message to a corresponding destination server directly in response to there being first IP address information in the whitelist that is the same as the second IP address information and first time-to-live information associated with the first IP address information is the same as the third time-to-live information.

According to one or more embodiments of the present disclosure, the method further includes: in response to no verification message returned by the client being received within preset duration, determining, via the security protection device, that the client is an attacking client, and discarding the data message.

According to one or more embodiments of the present disclosure, the network protection system further includes an optical splitter. Accordingly, the detecting, via the security detection device in response to receiving a data message sent by a client, whether a destination server corresponding to the data message is under cyberattack comprises: in response to receiving the data message sent by the client, copying the data message via the optical splitter, sending a copy of the data message to the security detection device, and detecting, via the security detection device, whether the destination server corresponding to the data message is under cyberattack.

The method further includes: in response to detecting that the destination server is not under cyberattack, sending, to the destination server, the data message sent by the client.

According to one or more embodiments of the present disclosure, the method further includes: in response to detecting that the destination server is not under cyberattack, sending the data message to the destination server.

In a second aspect, according to one or more embodiments of the present disclosure, there is provided a data processing apparatus applied to a network protection system that includes a security detection device and a security protection device. The apparatus includes:
 a detection module configured to detect, via the security detection device in response to receiving a data message sent by a client, whether a destination server corresponding to the data message is under cyberattack;
 a sending module configured to: in response to detecting that the destination server is under cyberattack, guide the data message to the security protection device, and send a test message to the client via the security protection device, where a sequence number of the test message is out of a sliding window of the client, so that the client is triggered to return a verification message to the security protection device; and
 a verification module configured to: verify, via the security protection device, the verification message returned by the client, and in response to the verification succeeding, determine that the client is a valid client and send the data message to the destination server, or in response to the verification failing, determine that the client is an attacking client and discard the data message.

According to one or more embodiments of the present disclosure, the apparatus further includes a message generating module configured to: determine an acknowledgement number of the data message sent by the client, and determine the sequence number of the test message to be the acknowledgement number of the data message minus a preset value; determine first session information of the data message sent by the client, the first session information including a source port, a destination port, a source address, a destination address, and a protocol type, and synchronize second session information of the test message to be the first session information; set a setting mode of the test message to ACK setting only; and/or set that no payload data is carried in the test message.

According to one or more embodiments of the present disclosure, that the verification module verifies, via the security protection device, the verification message returned by the client specifically includes: obtaining message information of the verification message; and determining, via the security protection device based on the message information of the verification message, whether the verification message is a keepalive message, and in response to the verification message being the keepalive message, determining that the verification succeeds, or in response to the verification message being not the keepalive message, determining that the verification fails.

According to one or more embodiments of the present disclosure, the message information of the verification message includes one or more of the following: session information, time-to-live information, a setting mode, whether payload data is carried, an acknowledgement number, and a sequence number. Accordingly, that the verification module determines, via the security protection device based on the message information of the verification message, whether the verification message is a keepalive message specifically includes: determining, via the security protection device based on at least one piece of message information of the verification message, whether the verification message is the keepalive message.

According to one or more embodiments of the present disclosure, the network protection system further includes a control center device. That the sending module guides the data message to the security protection device specifically includes: sending attack warning information to the control center device via the security detection device, where the control center device is configured to send a protection instruction to the security protection device in response to receiving the attack warning information, and the protection instruction carries IP address information of the destination server corresponding to the data message; and determining, via the security protection device, a routing device corresponding to the IP address information of the destination server in response to receiving the protection instruction, and guiding the data message to the security protection device via the routing device.

According to one or more embodiments of the present disclosure, a process in which the detection module detects, via the security detection device, whether the destination server corresponding to the data message is under cyberattack specifically includes: detecting, via the security detection device, a number of messages, a number of data packets, and a number of connected clients for the destination server corresponding to the data message; and in response to the number of messages being greater than a first preset threshold, the number of data packets is greater than a second preset threshold, and/or the number of connected clients is greater than a third preset threshold, determining that the destination server is under cyberattack; or in response to the number of messages being not greater than a first preset threshold, the number of data packets is not greater than a second preset threshold, and the number of connected clients is not greater than a third preset threshold, determining that the destination server is not under cyberattack.

According to one or more embodiments of the present disclosure, the apparatus further includes an addition module configured to: in response to the verification succeeding, associate first IP address information of the client with first time-to-live information of the data message, and add the first IP address information to a whitelist; determine, in response to receiving a new data message, second IP address information of a client corresponding to the new data message and third time-to-live information of the new data message; and send the new data message to a corresponding destination server directly in response to there being first IP address information in the whitelist that is the same as the second IP address information and first time-to-live information associated with the first IP address information is the same as the third time-to-live information.

According to one or more embodiments of the present disclosure, the apparatus further includes a discarding module configured to: in response to no verification message returned by the client being received within preset duration, determine, via the security protection device, that the client is an attacking client, and discard the data message.

According to one or more embodiments of the present disclosure, the network protection system further includes an optical splitter. That the detection module detects, via the security detection device in response to receiving the data message sent by the client, whether the destination server corresponding to the data message is under cyberattack, specifically includes: in response to receiving the data message sent by the client, copying the data message via the optical splitter, sending a copy of the data message to the security detection device, and detecting, via the security detection device, whether the destination server corresponding to the data message is under cyberattack.

The detection module is further configured to: in response to detecting that the destination server is not under cyberattack, send the data message to the destination server.

In a third aspect, according to one or more embodiments of the present disclosure, there is provided an electronic device. The electronic device includes a processor and a memory communicatively connected to the processor.

The memory stores computer-executable instructions.

The processor executes the computer-executable instructions stored in the memory, to implement the data processing method according to the first aspect and various possible designs of the first aspect.

In a fourth aspect, according to one or more embodiments of the present disclosure, there is provided a computer-readable storage medium storing computer-executable instructions that, when executed by a processor, cause the data processing method according to the first aspect and various possible designs of the first aspect to be implemented.

In a fifth aspect, an embodiment of the present disclosure provides a computer program product including a computer program that, when executed by a processor, causes the data processing method according to the first aspect and various possible designs of the first aspect to be implemented.

The foregoing descriptions are merely preferred embodiments of the present disclosure and explanations of the applied technical principles. A person skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A data processing method, applied to a network protection system that comprises a security detection device and a security protection device, the method comprising:
    detecting, via the security detection device in response to receiving a data message sent by a client, whether a destination server corresponding to the data message is under cyberattack;
    in response to detecting that the destination server is under cyberattack, guiding the data message to the security protection device, and sending a test message to the client via the security protection device, wherein a sequence number of the test message is out of a sliding window of the client, so that the client is triggered to return a verification message to the security protection device; and
    verifying, via the security protection device, the verification message returned by the client, and in response to the verification succeeding, determining that the client is a valid client and sending the data message to the destination server, or in response to the verification failing, determining that the client is an attacking client and discarding the data message.

2. The method according to claim 1, wherein before the sending a test message to the client via the security protection device, the method further comprises:
    determining an acknowledgement number of the data message sent by the client, and determining the sequence number of the test message to be the acknowledgement number of the data message minus a preset value; and/or
    determining first session information of the data message sent by the client, the first session information comprising a source port, a destination port, a source address, a destination address, and a protocol type, and synchronizing second session information of the test message to be the first session information; and/or
    setting a setting mode of the test message to ACK setting only; and/or setting the test message to carry no payload data.

3. The method according to claim 1, wherein the verifying, via the security protection device, the verification message returned by the client comprises:
   obtaining message information of the verification message; and
   determining, via the security protection device based on the message information of the verification message, whether the verification message is a keepalive message, and in response to the verification message being the keepalive message, determining that the verification succeeds, or in response to the verification message being not the keepalive message, determining that the verification fails.

4. The method according to claim 3, wherein the message information of the verification message comprises one or more of the following: session information, time-to-live information, a setting mode, whether payload data is carried, an acknowledgement number, and a sequence number; and
   accordingly, the determining, via the security protection device based on the message information of the verification message, whether the verification message is a keepalive message comprises:
   determining, via the security protection device based on at least one piece of message information of the verification message, whether the verification message is the keepalive message.

5. The method according to claim 1, wherein the network protection system further comprises a control center device; and the guiding the data message to the security protection device comprises:
   sending attack warning information to the control center device via the security detection device, wherein the control center device is configured to send a protection instruction to the security protection device in response to receiving the attack warning information, and the protection instruction carries IP address information of the destination server corresponding to the data message; and
   determining, via the security protection device, a routing device corresponding to the IP address information of the destination server in response to receiving the protection instruction, and guiding the data message to the security protection device via the routing device.

6. The method according to claim 1, wherein the process of detecting, via the security detection device, whether the destination server corresponding to the data message is under cyberattack comprises:
   detecting, via the security detection device, a number of messages, a number of data packets, and a number of connected clients for the destination server corresponding to the data message; and
   in response to the number of messages being greater than a first preset threshold, the number of data packets is greater than a second preset threshold, and/or the number of connected clients is greater than a third preset threshold, determining that the destination server is under cyberattack; or
   in response to the number of messages being not greater than the first preset threshold, the number of data packets is not greater than the second preset threshold, and the number of connected clients is not greater than the third preset threshold, determining that the destination server is not under cyberattack.

7. The method according to claim 1, further comprising:
   in response to the verification succeeding, associating first IP address information of the client with first time-to-live information of the data message, and adding the first IP address information to a whitelist;
   determining, in response to receiving a new data message, second IP address information of a client corresponding to the new data message and third time-to-live information of the new data message; and
   sending the new data message to a corresponding destination server directly in response to there being first IP address information in the whitelist that is the same as the second IP address information and first time-to-live information associated with the first IP address information is the same as the third time-to-live information.

8. The method according to claim 1, further comprising:
   in response to no verification message returned by the client being received within preset duration, determining, via the security protection device, that the client is an attacking client, and discarding the data message.

9. The method according to claim 1, wherein the network protection system further comprises an optical splitter;
   accordingly, the detecting, via the security detection device in response to receiving a data message sent by a client, whether a destination server corresponding to the data message is under cyberattack comprises:
   in response to receiving the data message sent by the client, copying the data message via the optical splitter, sending a copy of the data message to the security detection device, and detecting, via the security detection device, whether the destination server corresponding to the data message is under cyberattack; and
   the method further comprises: in response to detecting that the destination server is not under cyberattack, sending, to the destination server, the data message sent by the client.

10. An electronic device, comprising at least one processor and at least one memory communicatively connected to the at least one processor,
    wherein the at least one memory stores computer-executable instructions; and
    the at least one processor executes the computer-executable instructions stored in the at least one memory, to implement a data processing method which is applied to a network protection system that comprises a security detection device and a security protection device, and the method comprises:
    detecting, via the security detection device in response to receiving a data message sent by a client, whether a destination server corresponding to the data message is under cyberattack;
    in response to detecting that the destination server is under cyberattack, guiding the data message to the security protection device, and sending a test message to the client via the security protection device, wherein a sequence number of the test message is out of a sliding window of the client, so that the client is triggered to return a verification message to the security protection device; and
    verifying, via the security protection device, the verification message returned by the client, and in response to the verification succeeding, determining that the client is a valid client and sending the data message to the destination server, or in response to the verification failing, determining that the client is an attacking client and discarding the data message.

11. The electronic device according to claim 10, wherein before the sending a test message to the client via the security protection device, the method further comprises:

determining an acknowledgement number of the data message sent by the client, and determining the sequence number of the test message to be the acknowledgement number of the data message minus a preset value; and/or determining first session information of the data message sent by the client, the first session information comprising a source port, a destination port, a source address, a destination address, and a protocol type, and synchronizing second session information of the test message to be the first session information; and/or setting a setting mode of the test message to ACK setting only; and/or setting the test message to carry no payload data.

12. The electronic device according to claim 10, wherein the verifying, via the security protection device, the verification message returned by the client comprises:

obtaining message information of the verification message; and determining, via the security protection device based on the message information of the verification message, whether the verification message is a keepalive message, and in response to the verification message being the keepalive message, determining that the verification succeeds, or in response to the verification message being not the keepalive message, determining that the verification fails.

13. The electronic device according to claim 12, wherein the message information of the verification message comprises one or more of the following: session information, time-to-live information, a setting mode, whether payload data is carried, an acknowledgement number, and a sequence number; and accordingly, the determining, via the security protection device based on the message information of the verification message, whether the verification message is a keepalive message comprises:

determining, via the security protection device based on at least one piece of message information of the verification message, whether the verification message is the keepalive message.

14. The electronic device according to claim 10, wherein the network protection system further comprises a control center device; and the guiding the data message to the security protection device comprises:

sending attack warning information to the control center device via the security detection device, wherein the control center device is configured to send a protection instruction to the security protection device in response to receiving the attack warning information, and the protection instruction carries IP address information of the destination server corresponding to the data message; and determining, via the security protection device, a routing device corresponding to the IP address information of the destination server in response to receiving the protection instruction, and guiding the data message to the security protection device via the routing device.

15. The electronic device according to claim 10, wherein the process of detecting, via the security detection device, whether the destination server corresponding to the data message is under cyberattack comprises:

detecting, via the security detection device, a number of messages, a number of data packets, and a number of connected clients for the destination server corresponding to the data message; and in response to the number of messages being greater than a first preset threshold, the number of data packets is greater than a second preset threshold, and/or the number of connected clients is greater than a third preset threshold, determining that the destination server is under cyberattack; or in response to the number of messages being not greater than the first preset threshold, the number of data packets is not greater than the second preset threshold, and the number of connected clients is not greater than the third preset threshold, determining that the destination server is not under cyberattack.

16. The electronic device according to claim 10, wherein the method further comprises:

in response to the verification succeeding, associating first IP address information of the client with first time-to-live information of the data message, and adding the first IP address information to a whitelist;

determining, in response to receiving a new data message, second IP address information of a client corresponding to the new data message and third time-to-live information of the new data message; and sending the new data message to a corresponding destination server directly in response to there being first IP address information in the whitelist that is the same as the second IP address information and first time-to-live information associated with the first IP address information is the same as the third time-to-live information.

17. The electronic device according to claim 10, wherein the method further comprises:

in response to no verification message returned by the client being received within preset duration, determining, via the security protection device, that the client is an attacking client, and discarding the data message.

18. The electronic device according to claim 10, wherein the network protection system further comprises an optical splitter;

accordingly, the detecting, via the security detection device in response to receiving a data message sent by a client, whether a destination server corresponding to the data message is under cyberattack comprises:

in response to receiving the data message sent by the client, copying the data message via the optical splitter, sending a copy of the data message to the security detection device, and detecting, via the security detection device, whether the destination server corresponding to the data message is under cyberattack; and the method further comprises: in response to detecting that the destination server is not under cyberattack, sending, to the destination server, the data message sent by the client.

19. A non-transient computer-readable storage medium, storing computer-executable instructions that, when executed by a processor, cause a data processing method to be implemented, wherein the data processing method is applied to a network protection system that comprises a security detection device and a security protection device, and the method comprises:

detecting, via the security detection device in response to receiving a data message sent by a client, whether a destination server corresponding to the data message is under cyberattack;

in response to detecting that the destination server is under cyberattack, guiding the data message to the security protection device, and sending a test message to the client via the security protection device, wherein a sequence number of the test message is out of a sliding window of the client, so that the client is triggered to return a verification message to the security protection device; and verifying, via the security protection device, the verification message returned by the client, and in response to the verification succeeding, determining that the client is a valid client and sending the data message to the destination server, or in response to the verification failing, determining that the client is an attacking client and discarding the data message.

20. The storage medium according to claim 19, wherein before the sending a test message to the client via the security protection device, the method further comprises:

determining an acknowledgement number of the data message sent by the client, and determining the sequence number of the test message to be the acknowledgement number of the data message minus a preset value; and/or determining first session information of the data message sent by the client, the first session information comprising a source port, a destination port, a source address, a destination address, and a protocol type, and synchronizing second session information of the test message to be the first session information; and/or setting a setting mode of the test message to ACK setting only; and/or setting the test message to carry no payload data.

* * * * *